358-190. OR 3,824,338 SR

United States Patent [19]
Suzuki et al.

[11] 3,824,338
[45] July 16, 1974

[54] TELEVISION RECEIVER POWER SUPPLY

[76] Inventors: Takuji Suzuki; Norihisa Imao, both of c/o The General Corporation, 1116, Suenaga, Kawasaki-shi, Japan

[22] Filed: June 6, 1973

[21] Appl. No.: 367,650

Related U.S. Application Data

[63] Continuation-in-part of Ser. No. 113,982, Feb. 9, 1971, abandoned.

[30] Foreign Application Priority Data

Feb. 12, 1970 Japan .............................. 45-14079

[52] U.S. Cl. ..... 178/7.3 R, 178/7.3 S, 178/DIG. 11, 323/DIG. 1

[51] Int. Cl. .......................................... H04n 5/44

[58] Field of Search ........... 178/7.3 R, 7.5 R, 7.3 S, 178/7.5 S, DIG. 11; 323/DIG. 1; 315/27 R, 27 TD; 328/258, 259, 260, 262, 263

[56] References Cited

UNITED STATES PATENTS 2,987,649 6/1961 Watson .............................. 315/30
3,461,232 8/1969 Wendt ............................ 178/7.3 R

*Primary Examiner*—Robert L. Richardson

[57] ABSTRACT

A television receiver of transformerless type having primary and secondary voltage supply circuits which respectively supply ungrounded and grounded supply voltages to horizontal and vertical deflection circuits on the one hand and other remaining circuit components on the other hand. D.c. isolation is provided between the grounded and ungrounded components by an isolating transformer connected between sync signal amplifier means and the deflection circuits, the transformer however permitting a.c. signal transmission between the sync signal amplifier means and the deflection circuits.

3 Claims, 4 Drawing Figures

T5117

TELEVISION RECEIVER POWER SUPPLY

Figure 1:
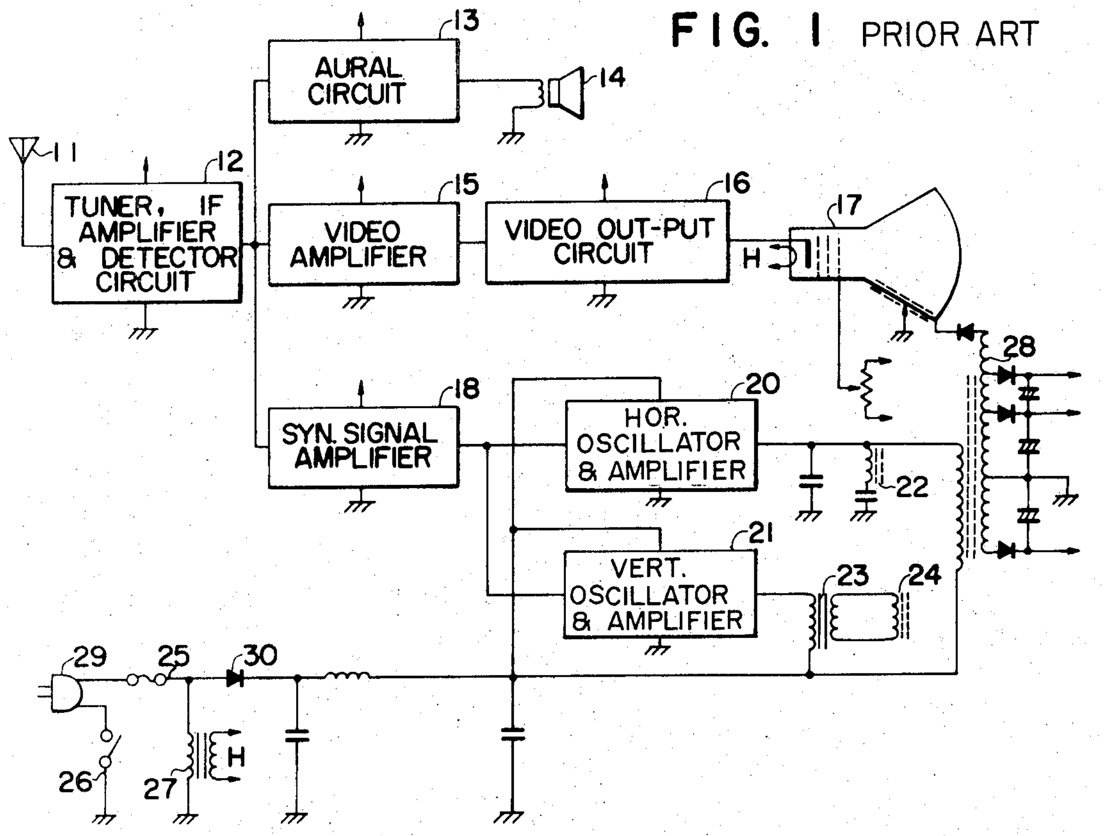
FIG. 1 PRIOR ART

The present application is a continuation-in-part of our earlier application Ser. No. 113982 filed Feb. 9th, 1971, now abandoned.

The invention disclosed herein relates to a television receiver, and more particularly, to a novel combined a.c. signal transmission-d.c. blocking means utilizing at least in part, a power source of the transformerless type.

As known, a transformerless type power supply, that is a supply which does not use a power transformer for isolating the chassis of the receiver components from the "hot" side of a domestic power source, has the advantage of reducing the weight, cost and power dissipation of the receiver.

In one prior art arrangement utilizing a transformerless power supply, the electrical components in the receiver and the chassis carrying the same are directly grounded. To avoid the danger of the user being subjected to electric shock on touching the grounded chassis should the receiver power line plug be inserted in a domestic power source in a position to apply the "hot" high voltage side of the source to the chassis, it has been the practice to insulate the chassis from the cabinet of the receiver set. Externally located knobs, their associated controls, and antenna circuits also had to be electrically insulated from the grounded chassis to avoid serious injury to the user. When record player and channel converter components are used in association with such television receivers, these components also had to be electrically insulated from the grounded receiver chassis.

In another prior art arrangement exemplified by U.S. Pat. No. 3,461,232, a transformerless power supply is provided for the receiver which obviates some of the problems attached to the previously described prior art arrangement of directly grounding all receiver components. In the noted patent there is described an arrangement whereby two effective power sources are provided, a first of which is isolated d.c. wise from the second, the latter only having a direct connection to ground. In the patent, the first power source is derived from a transformerless power supply network in the receiver and supplies the primary side of a horizontal output flyback transformer as well as other components in the horizontal deflection circuit; i.e., a horizontal AFC stage, a horizontal oscillator and buffer stage as well as a horizontal driver stage for the horizontal output. The second power source is developed at the secondary side of the horizontal output flyback transformer and supplies the remaining components of the receiver. Since the primary and secondary windings are electrically insulated from one another, the second power source will also be electrically insulated from the first and may thus be independently grounded of the first power source. In this manner, the user is not exposed to any danger when touching grounded components supplied by the second power source since the "hot" side of the domestic source will not be applied to such grounded components, regardless of the position of the plug, because as mentioned, the first power source is electrically insulated from the second by the windings of the horizontal output flyback transformer.

In U.S. Pat. No. 3,461,232 the horizontal automatic frequency control is driven by line synchronizing pulses supplied thereto from a sync separator by a small coupling condenser. Transients or external noise which would otherwise exist at the ungrounded horizontal automatic frequency control and which would undesirably be coupled back to the sync separator through the coupling condenser, are eliminated by connecting the horizontal automatic frequency control to chassis ground for a.c. through a second small condenser.

Should the second small condenser be or become "shorted", the horizontal automatic frequency control and related components would be connected to chassis ground for both a.c. and d.c. in which event the first power source becomes grounded along with the second grounded power source, whereby the user will be exposed to the dangers mentioned with respect to the first described prior art arrangement.

The term "power transformer" as used herein refers to a transformer used in a commercial power supply network for supplying power to the deflection circuits from a commercial power supply, and should not be confused with transformers in other portions of the receiver designated by different terms. Thus, the expression "television receiver of a power transformerless type" refers to a television receiver which does not use the defined power transformer.

It is an object of the invention to provide in conjunction with a transformerless power supply a transformer coupling means effective to isolate, d.c. wise, deflection circuits of the receiver from grounded receiver circuit components while at the same time enabling a.c. coupling between components to be coupled to one another.

It is another object of the invention to provide a transformerless power supply and a transformer coupling means which co-operate to permit operation of the deflection circuits without need for connecting the deflection circuits to chassis ground for a.c. by means of a small coupling condenser or otherwise.

It is a further object of the invention to provide transformerless coupling means having a turns ratio between the primary and secondary windings thereof effective to couple in a forward direction a sync signal amplifier output to the ungrounded horizontal and vertical deflection circuits while substantially attenuating in the reverse direction transients and external noise prevalent in the ungrounded deflection circuits.

With the above objects in view we provide in accordance with the invention a television receiver comprising grounded tuner, amplifier and detector circuit means for respectively supplying predetermined signal voltages to grounded audio, video, amplifier and sync signal amplifier stages, electrically ungrounded horizontal and vertical deflection circuit means operatively connected to the output of said grounded sync signal amplifier stage for respectively providing as a function of said sync signal a horizontal and a vertical sweep signal each of predetermined frequency, an ungrounded transformerless first power source for feeding ungrounded B power to both said electrically ungrounded horizontal and vertical deflection circuit means, a second grounded power source electrically isolated from the first power source and supplying a grounded B voltage to said grounded tuner, amplifier and detector circuit means and to said grounded stages, and insulating transformer means operatively connected between said grounded sync signal amplifier and said electrically ungrounded horizontal and vertical deflection circuit means for both passing the output of said sync signal amplifier to said oscillator deflection circuit means and blocking d.c. current flow therebetween thereby effectively isolating said ungrounded B supply from said grounded B supply.

In one embodiment, the first ungrounded and second grounded power sources are also isolated from one another by virtue of the first power source being associated with the primary and the secondary power source with the secondary winding of a horizontal flyback transformer supplied by the output of a horizontal deflection circuit means, the latter including as in U.S. Pat. No. 3,461,232, a horizontal oscillator, driver and amplifier means.

Figure 4:
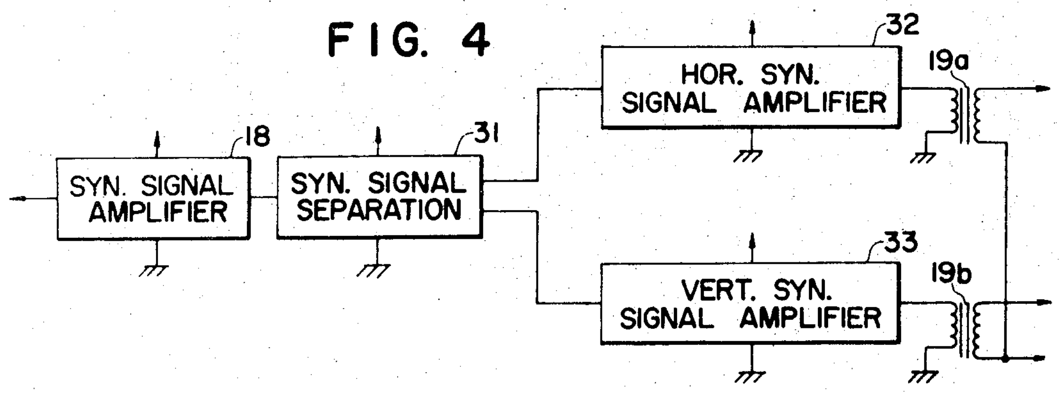
Figure 2:
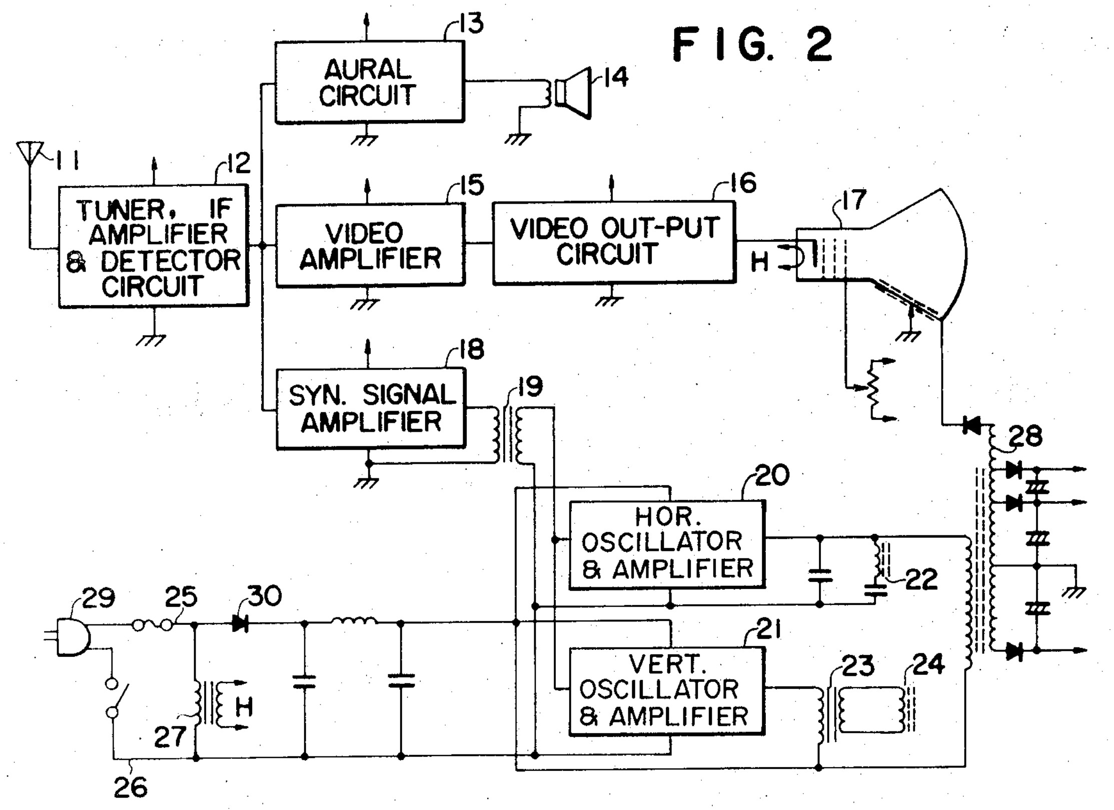
Figure 3:
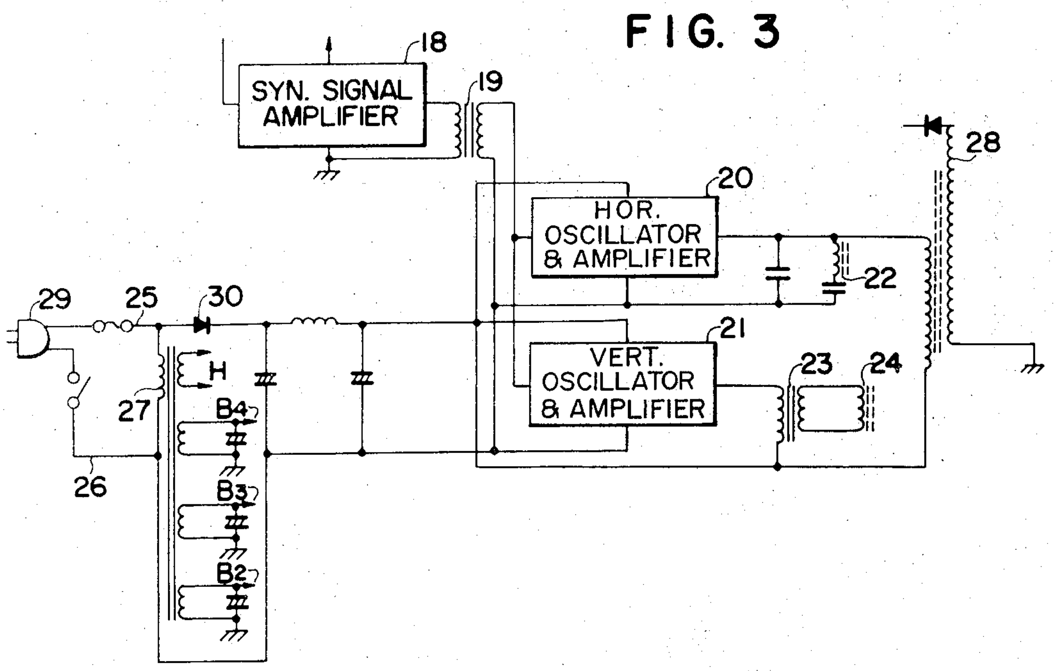

The above and other objects, features and advantages of the invention will better be understood from the following description of specific embodiments illustrated in the drawings, in which:

FIG. 1 is a circuit diagram, partially in block diagram, of a prior art television receiver of transformerless type, FIG. 2 is a similar circuit diagram to FIG. 1, but illustrating the television receiver according to the invention, FIG. 3 is a circuit diagram of part of another embodiment of the television receiver of the invention, and FIG. 4 is a circuit diagram showing a modification of the parts designated by characters 18 and 19 in FIGS. 2 and 3.

Throughout the drawings, inclusive of FIG. 1 showing a prior art arrangement, like parts are designated by the same reference characters.

Referring to FIG. 1, we have exemplified the first of the prior art voltage supply arrangements for a television receiver of the power transformerless type above described. As shown, the signals received by an antenna 11 are selected, amplifier and detected by tuner, intermediate frequency and detector circuit 12 for supply along three paths. The first of these paths comprises an audio circuit stage 13 which includes, as known, a sound intermediate frequency amplifier, a sound intermediate frequency detector and an audio amplifier stage for conversion of electrical signals into audible signals by a speaker 14. Another path comprises video amplifier 15 and video output circuit 16 connected to a picture tube 17. The remaining path comprises a synchronizing signal amplifier stage 18, a horizontal oscillator and output amplifier circuit 20 and a vertical oscillator and output amplifier circuit 21. The output from the circuit 20 is coupled with a horizontal deflection coil 22, while the output from the circuit 21 is coupled with a vertical deflection coil 24 through a vertical output transformer 23. The horizontal oscillator and output amplifier circuit 20 may include, as in U.S. Pat. No. 3,461,232, a horizontal AFC, a horizontal oscillator and buffer, a horizontal driver and a horizontal output, the latter supplying, as known, the high voltage flyback transformer. The vertical oscillator and amplifier circuit 21 may include, also as in U.S. Pat. No. 3,461,232, a vertical oscillator and a vertical output.

What has been described with respect to FIG. 1 applies to one type of a conventional transformerless power source for a television receiver. In such receiver, the a.c. power input supplied at 29 by a conventional plug when connected to a domestic power source, is applied across a pair of supply lines 25 and 26 across which a cathode heater transformer 27 is connected for supply of heater voltage. The a.c. voltage is rectified by a diode 30 and passed through a filter circuit for connection with the horizontal and vertical oscillator and output circuits 20 and 21 as well as with the primary coil of the flyback transformer 28. Outputs may be taken from several taps on the secondary coil of flyback transformer 28 and rectified by rectifiers, as shown, to supply power to each of the tuner and intermediate frequency amplifier and detector circuit stage 12, audio circuit stage 13, video amplifier 15 and video output circuit 16, the synchronizing signal separation stage 18 and other circuits. In the prior art transformerless power supply arrangement all of these circuits including the deflection circuits were connected with the grounded supply line 26 of the a.c. power input 29 as shown in FIG. 1, with consequence that a.c. voltage was directly applied to the chassis. Alternatively, as disclosed in U.S. Pat. No. 3,461,232 all circuit stages supplied by the secondary power source are grounded excepting for the horizontal deflection circuit stage supplied by the ungrounded primary power source.

In U.S. Pat. No. 3,461,232 a small coupling condenser is used between the sync separator and the horizontal deflection stage for passing a.c. while blocking d.c. signals therebetween. Since such small condenser couples in both directions it is necessary to eliminate transients and high level noise signals which normally occur in circuits which "float" in relation to grounded circuit stages. To eliminate these transients and unwanted noise, a second small condenser is provided for connecting elements of the horizontal deflection stage to chassis ground. As previously described, the inclusion of such small condenser presents a degree of risk to people should such condenser be or become short-circuited.

In accordance with the invention we eliminate the need for the second small condenser by utilizing transformer coupling means in place of the coupling condenser. By suitably selecting the turns ratio of the transformer coupling means we are able to provide in the desired coupling direction a signal of sufficient amplitude to ensure a high signal to noise ratio in the ungrounded horizontal and vertical deflection stages while at the same time, by virtue of the isolation between the primary and secondary windings of the transformer coupling means, isolating the grounded stages from the ungrounded deflection stages. Also because of the turns ratio of the transformer coupling means transients and noise present in the ungrounded deflection circuits are advantageously attenuated when reverse coupled from the deflection circuits to the sync signal amplifier.

Referring to FIG. 2, a rectified output is supplied by diode 30 and serves as a first or primary power source. The circuitry supplied by this power source is for convenience designated as a primary power circuit. In the FIG. 2 embodiment, rectified outputs derived from the taps on the secondary coil of the flyback transformer 28 are used as the second power source, and the circuitry supplied by this power source is for convenience designated as a secondary power circuit.

In accordance with the invention, an insulating or separating transformer means 19 is provided between the synchronizing signal amplifier 18 and the horizontal and vertical oscillator and output circuits 20, 21. Transformer means 19 provides d.c. isolation between the primary and secondary power circuits while passing, due to the step up turns ratio of for example 1 to 1 or higher between the primary and secondary windings, a synchronizing pulse of sufficient magnitude to the deflection circuits to ensure a high signal to noise ratio in the deflection circuits notwithstanding they are ungrounded, directly or indirectly. It is to be observed that a d.c. isolation is also provided between the primary and secondary coils of the flyback transformer to provide thereby separation between the primary and secondary power circuits. The signal frequencies passed through the transformer means 19 are usually square waves of 60 HZ and 15,750 HZ for vertical and horizontal synchronization, respectively, so that a small transformer using silicon steel sheets is sufficient for this purpose. Where the detected output from the circuit 12 is of sufficient amplitude, the amplifier 18 may be omitted, with the insulating transformer 19 being connected between the circuit 12 and the horizontal and vertical output circuits 20 and 21.

FIG. 3 shows another embodiment of the invention in which the secondary power source is derived from a secondary coil of a cathode heater transformer 27 the primary of which is directly connected to a domestic power source. FIG. 3 accordingly shows a transformerless supply for the deflection circuits only. Because the power dissipation of the secondary power circuit is approximately on the order of one-third to one-fifth the power dissipation in the primary power circuit, it is feasible and advantageous to supply the secondary power circuits from a transformer power source utilizing the cathode heater transformer 27. The secondary coil of the heater transformer 27 is provided with several taps, and the voltage outputs therefrom are rectified before being supplied to the secondary power circuits.

FIG. 4 shows a modified form of the invention for coupling the synchronizing signal circuit with the deflection circuits, the modified form also being applicable to the FIGS. 2 and 3 embodiments. The form of the invention illustrated in FIG. 4 may be used where it is desired to have a synchronizing signal having a wave form of increased fidelity. Specifically, the synchronizing signal amplifier 18 is followed by a synchronizing signal separation circuit 31, which is in turn followed by a separately provided horizontal synchronizing signal amplifier 32 and a vertical synchronizing signal amplifier 33. These amplifiers 32 and 33 are coupled by separate insulating transformers 19*a* and 19*b* with the ungrounded primary power circuits 20 and 21, respectively. The secondary power circuits are connected between the secondary power source and ground. It will be seen that the transformer means in all embodiments have one leg of the primary coil winding connected to ground.

From the foregoing, it will be evident that the transformer coupling means not only provides complete d.c. separation between the primary and secondary power circuits but also, notwithstanding the high noise levels in the ungrounded deflection circuits, obviates the need for connecting elements thereof to chassis ground so that they may be left floating eliminating thereby the danger intrinsic in the arrangement of U.S. Pat. No. 3,461,232.

While the invention has been described in connection with particular embodiments thereof, it should be understood that they are illustrative only and hence not limitative. The scope of the invention is defined by the following appended claims.

We claim:

1. A television receiver comprising grounded tuner, amplifier and detector circuit means for respectively supplying predetermined signal voltages to grounded audio, video, amplifier and sync signal amplifier stages, electrically ungrounded horizontal and vertical deflection circuit means operatively connected to the output of said grounded sync signal amplifier stage for respectively providing as a function of said sync signal a horizontal and a vertical sweep signal each of predetermined frequency, a source of line voltage, an ungrounded transformerless power source connected to said line voltage for supplying ungrounded B power to both said electrically ungrounded horizontal and vertical deflection circuit means, a second grounded power source having a primary winding connected to said line voltage and ground connected secondary windings electrically isolating said second grounded power source from said ungrounded power source, said grounded power source providing at its secondary winding a plurality of grounded B voltage supplies for supplying grounded voltages to said grounded tuner, amplifier and detector circuit means and to said grounded stages, and signal transferring, insulating transformer means operatively connected between said grounded sync signal amplifier and said electrically ungrounded horizontal and vertical deflection circuit means for both transferring the output of said sync signal amplifier to said oscillator deflection circuit means and for blocking d.c. current flow therebetween.

2. A television receiver according to claim 1, wherein separate insulating transformer means are provided for separately connecting said horizontal and vertical deflection circuit means to associated horizontal and vertical sync signal amplifiers supplied with the output of a sync signal separator whose input is connected to the output of said sync signal amplifier stage.

3. A television receiver according to claim 1, wherein said insulating transformer means comprises a step-up transformer having a turns ratio of 1 to 1 between the primary and secondary windings of said transformer means.

* * * * *